(No Model.)
J. C. ANDERSON.
ART OF COLORING BRICKS.
No. 468,321. Patented Feb. 9, 1892.
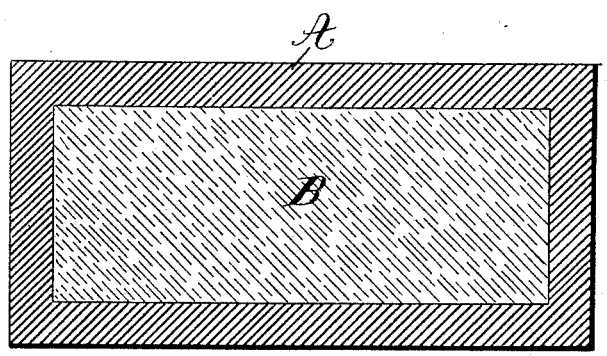
Witnesses
H. M. Sterling
Alex Mahon
Inventor
J. C. Anderson
By his Attorney
S. W. Finsabaugh

UNITED STATES PATENT OFFICE.

JAMES C. ANDERSON, OF HIGHLAND PARK, ILLINOIS.

ART OF COLORING BRICK.

SPECIFICATION forming part of Letters Patent No. 468,321, dated February 9, 1892.

Application filed March 1, 1890. Serial No. 342,256. (No specimens.)

*To all whom it may concern:*

Be it known that I, JAMES C. ANDERSON, a citizen of the United States, residing at Highland Park, in the county of Lake and State of Illinois, have invented new and useful Improvements in the Art of Coloring Bricks; and I do hereby declare the following to be a full, clear, and exact description of said invention, reference being had to the accompanying drawing, and to the letters of reference marked thereon, which form a part of this specification.

My invention relates to an improvement in the art of coloring brick.

The object of my invention is to transfer the partially burned or "salmon" brick into brick suitable for the front or face walls of buildings; and to this end my invention consists in taking the salmon and light-colored brick and subjecting them to a bath of metallic chlorides in solution, and in then reburning the brick, so as to fix the metallic colors which have been deposited in the pores of the brick, thus converting an almost unsalable article into a high class of colored bricks.

Numerous patents have been granted to me for the production of brick and other clay bodies of colors embracing the different shades, tints, drosses, &c., in which the color-giving metals and metal oxides are used by being commingled with the clay to a greater or less homogeneity in the powdered, semi-powdered, and granulated conditions. These inventions have proved most satisfactory in practical results in all the various colors and effects, as well as the highest quality, yet it will be seen that such method of incorporating the coloring-matter must be confined to the clay before the same is molded into bricks, and, moreover, when the coloring-matter is incorporated throughout the entire mass of clay composing the brick great waste must take place in the coloring-matter by being placed in the central portions of the brick where such color is not required.

My present invention therefore consists in using the various color-giving metals in the shape of the chlorides or in the most soluble condition, which metals are put in solution with water or other suitable solvents to the desired degree of solution to give the desired color to the brick when the partly-burned brick before described is plunged or dipped into this solution, and the solution will be immediately absorbed into the pores of the brick, the operation being performed quickly if it is desired to have the coloring-matter to permeate but slightly into the surface of the brick. If, however, it is desired to have the coloring-matter enter well into the brick-body, a longer time is taken in the dipping operation, after which the bricks so treated are again placed into the kiln and given a full firing, from which they will emerge adorned with the desired color or colors, which colors lie deep enough into the surface of the brick for all practical purposes to which the bricks are subjected in the outer walls of a building, and at the same time do not embrace the whole body of the brick, but leave the core containing the major part thereof untouched, so that in fact the main body of the brick remains in its natural color. It will be seen, moreover, that the metal colors being in solution can be used more sparingly in giving the same degree of color.

In the drawing I have shown a sectional view of a brick, in which the outer portion A indicates the line of color which has been given to the brick, and B the central portion of the same, which has not been touched by the coloring-matter, but remains in the original color of the brick. The salmon or partially-burned brick as they come from the kiln are very porous and consequently will absorb a vast amount of water with great avidity, so that the coloring-matter will be readily absorbed and fill the pores and afterward become fixed by the heat in the final burning.

When it is desired to produce a vitreous or semi-vitreous effect on the surface of the brick, I add to the solution a like solution of one of the fluxes—viz., chloride of sodium, potassium, borax, &c.—or I may add the fluxes only to produce a brick having a vitreous body to a sufficient depth to resist every and all requirements incident to any purposes to which bricks may be subjected, to all practical purposes as complete and durable as though the entire brick-body was rendered vitreous in the same degree, said brick being contradistinguished from any and all surface or incrusted brick.

This process may be carried on until the material is absorbed to the very core, and the brick product becomes a unit in this condition.

So far I have described the object of this invention to be the utilization of salmon brick only; but it will be understood that the scope of this invention embraces practically a much wider field, as brick and other like articles of clay may be molded and formed in the usual manner and partly burned, after which my method of absorption of the metals in solution into the pores may be employed, and all the various colors and shades of colors may thus be imparted to the body of such articles.

What I claim is—

The method of utilizing salmon brick, which consists in applying to the partially-burned brick a coloring-matter and then subjecting the same to a final burning operation fixing the color of the brick, as set forth.

In testimony whereof I affix my signature in the presence of two subscribing witnesses.

J. C. ANDERSON.

Witnesses:
ALEX MAHON,
H. M. STERLING.